US012676314B2

(12) United States Patent
Lee et al.

(10) Patent No.: US 12,676,314 B2
(45) Date of Patent: Jul. 7, 2026

(54) ELECTRODE INCLUDING ACTIVE MATERIAL LAYER IN BILAYER STRUCTURE, MANUFACTURING METHOD THEREFOR, AND SECONDARY BATTERY COMPRISING SAME

(71) Applicant: LG Energy Solution, Ltd., Seoul (KR)

(72) Inventors: Taek-Soo Lee, Daejeon (KR); Shin-Wook Jeon, Daejeon (KR); Hyung-Suk Cho, Daejeon (KR); Sang-Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 525 days.

(21) Appl. No.: 18/034,416

(22) PCT Filed: Nov. 3, 2021

(86) PCT No.: PCT/KR2021/015830
§ 371 (c)(1),
(2) Date: Apr. 28, 2023

(87) PCT Pub. No.: WO2022/098098
PCT Pub. Date: May 12, 2022

(65) Prior Publication Data

US 2023/0369597 A1 Nov. 16, 2023

(30) Foreign Application Priority Data

Nov. 3, 2020 (KR) ........................ 10-2020-0145516

(51) Int. Cl.

| | |
|---|---|
| ***H01M 4/62*** | (2006.01) |
| ***H01M 4/13*** | (2010.01) |
| ***H01M 4/36*** | (2006.01) |
| ***H01M 10/0525*** | (2010.01) |
| *H01M 4/02* | (2006.01) |

(52) U.S. Cl.
CPC ............. *H01M 4/622* (2013.01); *H01M 4/13* (2013.01); *H01M 4/366* (2013.01); *H01M 10/0525* (2013.01); *H01M 2004/027* (2013.01)

(58) Field of Classification Search
CPC ........ H01M 4/622; H01M 4/13; H01M 4/366; H01M 10/0525; H01M 2004/027; H01M 4/133; H01M 4/587; H01M 4/624; H01M 10/052; Y02E 60/10
See application file for complete search history.

(56) References Cited

U.S. PATENT DOCUMENTS

| | | | |
|---|---|---|---|
| 2013/0216891 A1 | 8/2013 | Byun et al. | |
| 2014/0287316 A1 | 9/2014 | Ahn et al. | |
| 2016/0156038 A1 | 6/2016 | Park et al. | |
| 2018/0219217 A1 * | 8/2018 | Park | H01M 4/133 |
| 2021/0005927 A1 * | 1/2021 | Hoffert | H01M 10/0565 |

FOREIGN PATENT DOCUMENTS

| | | | | |
|---|---|---|---|---|
| CN | 103259039 A | 8/2013 | | |
| CN | 104981927 A | 10/2015 | | |
| CN | 107925058 A | 4/2018 | | |
| JP | 4361241 B2 | 11/2009 | | |
| JP | 2013-131381 A | 7/2013 | | |
| JP | 5573082 B2 | 8/2014 | | |
| KR | 20070023141 A | * | 2/2007 | H01M 10/0525 |
| KR | 10-0845702 B1 | 7/2008 | | |
| KR | 10-2014-0140976 A | 12/2014 | | |
| KR | 10-1560471 B1 | 10/2015 | | |
| KR | 10-2017-0111725 A | 10/2017 | | |
| KR | 10-2019-0029320 A | 3/2019 | | |
| KR | 10-2019-0134021 A | 12/2019 | | |

OTHER PUBLICATIONS

International Search Report (with translation) and Written Opinion dated Feb. 28, 2022, for corresponding International Patent Application No. PCT/KR2021/015830.
Office Action dated Jan. 1, 2026 issued in the corresponding Chinese Patent Application No. 202180065515.8.

* cited by examiner

*Primary Examiner* — Michael Y Sun
(74) *Attorney, Agent, or Firm* — Morgan, Lewis & Bockius LLP

(57) ABSTRACT

Disclosed is an electrode including a multilayer structured electrode active material layer having two or more stacked sub-layers. The electrode is characterized in that the content of repeating unit (c) derived from a vinyl cyanide compound and repeating unit (d) derived from a (meth)acrylate compound in the lower layer is smaller than the content in the upper layer. It is possible to improve the binding force and resistance characteristics of the multilayer structured electrode by using a different composition of binder at the bottommost portion that is in contact with the current collector and at the topmost portion that is in contact with the separator. When using the multilayer structured electrode obtained by controlling the binder composition of the topmost portion and that of the bottommost portion to have a suitable composition of ingredients, it is possible to further improve battery performance, including capacity, life, output, or the like.

13 Claims, No Drawings

ELECTRODE INCLUDING ACTIVE MATERIAL LAYER IN BILAYER STRUCTURE, MANUFACTURING METHOD THEREFOR, AND SECONDARY BATTERY COMPRISING SAME

TECHNICAL FIELD

The present application claims priority to Korean Patent Application No. 10-2020-0145516 filed on Nov. 3, 2020 in the Republic of Korea. The present disclosure relates to an electrode for an electrochemical device. Particularly, the present disclosure relates an electrode for an electrochemical device showing improved adhesion to a current collector not only in a dry state before being in contact with an electrolyte but also in a wet state after being wetted with an electrolyte. The present disclosure also relates to an electrochemical device including the electrode.

BACKGROUND ART

As technical development and needs for mobile instruments have been increased, secondary batteries that are rechargeable and can be downsized and provided with high capacity have been increasingly in demand. In addition, among such secondary batteries, lithium secondary batteries having high energy density and operating voltage have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

Meanwhile, as secondary batteries for electric vehicles or power storage systems have been increasingly in demand recently, there has been a need for an electrode with a high-loading electrode active material in order to provide the batteries with high capacity and high energy density. However, when forming such a high-loading electrode in the form of a monolayer electrode, the binder contained in the electrode slurry cannot be dispersed homogeneously in the electrode active material layer and may float on the surface of the electrode active material layer with ease. In this case, the battery shows increased resistance due to the binder, resulting in degradation of the battery performance.

DISCLOSURE

Technical Problem

The present disclosure is designed to solve the problems of the related art, and therefore the present disclosure is directed to providing an electrode including a multilayer structured electrode active material layer so that the binder material may be dispersed homogeneously in the electrode. The present disclosure is also directed to providing an electrode showing improved peel strength between the electrode active material layer and the current collector and improved resistance characteristics by using a different composition of binder resin in each electrode active material layer.

Technical Solution

According to the first embodiment of the present disclosure, there is provided an electrode for an electrochemical device, including: an electrode current collector; and a multilayer structured electrode active material layer disposed on at least one surface of the electrode current collector and having two or more stacked sub-layers, wherein the electrode active material layer includes an electrode active material, a binder resin and a conductive material, the bottommost layer of the multilayer structured electrode active material layer includes copolymer resin (A) as a binder resin, the topmost layer is disposed on the top of the bottommost layer, and the topmost layer of the multilayer structured electrode active material layer includes copolymer resin (B) as a binder resin, the copolymer resin (A) is a copolymer containing, as a repeating unit, at least one selected from: (a) a vinyl aromatic monomer; (b) a conjugated diene-based monomer; (c) a vinyl cyanide compound-derived repeating unit; and (d) a (meth)acrylate compound-derived repeating unit, the copolymer resin (B) is a copolymer containing at least one selected from: (a) a vinyl aromatic monomer; (b) a conjugated diene-based monomer; (c) a vinyl cyanide compound-derived repeating unit; and (d) a (meth) acrylate compound-derived repeating unit, and the sum of the content (wt %) of the repeating unit (c) and the content (wt %) of the repeating unit (d) in the binder resin in the topmost layer is larger than the sum of the content (wt %) of the repeating unit (c) and the content (wt %) of the repeating unit (d) in the binder resin in the bottommost layer.

According to the second embodiment of the present disclosure, there is provided the electrode for an electrochemical device as defined in the first embodiment, wherein the vinyl cyanide compound is at least one selected from acrylonitrile and methacrylonitrile.

According to the third embodiment of the present disclosure, there is provided the electrode for an electrochemical device as defined in the first or the second embodiment, wherein the (meth)acrylate compound is at least one selected from methyl acrylate, ethyl acrylate, propyl acrylate, butyl acrylate, hexyl acrylate, 2-ethylhexyl acrylate, methyl methacrylate, ethyl methacrylate, propyl methacrylate, butyl methacrylate, hexyl methacrylate and 2-ethylhexyl methacrylate.

According to the fourth embodiment of the present disclosure, there is provided the electrode for an electrochemical device as defined in any one of the first to the third embodiments, wherein the bottommost layer includes copolymer resin (A) containing at least two selected from: (a) a vinyl aromatic monomer: (b) a conjugated diene-based monomer, (c) a vinyl cyanide compound-derived repeating unit; and (d) a (meth)acrylate compound-derived repeating unit, as a binder resin.

According to the fifth embodiment of the present disclosure, there is provided the electrode for an electrochemical device as defined in any one of the first to the fourth embodiments, wherein the topmost layer includes copolymer resin (B) containing at least three selected from: (a) a vinyl aromatic monomer: (b) a conjugated diene-based monomer, (c) a vinyl cyanide compound-derived repeating unit; and (d) a (meth)acrylate compound-derived repeating unit, as a binder resin.

According to the sixth embodiment of the present disclosure, there is provided the electrode for an electrochemical device as defined in any one of the first to the fifth embodiments, wherein the bottommost layer includes a quaternary copolymer of styrene-butadiene-acrylonitrile-repeating unit (d) and/or a binary copolymer of styrene-butadiene, as a binder resin, and the repeating unit (d) is derived from butyl acrylate and/or methyl methacrylate.

According to the seventh embodiment of the present disclosure, there is provided the electrode for an electrochemical device as defined in the sixth embodiment, wherein the quaternary copolymer of styrene-butadiene-acrylonitrile-repeating unit (d) includes the acrylonitrile repeating unit and repeating unit (d) at a content of 20% or less based on 100 wt % of the quaternary copolymer.

According to the eighth embodiment of the present disclosure, there is provided the electrode for an electrochemical device as defined in any one of the first to the seventh embodiments, wherein the bottommost layer includes a quaternary copolymer of styrene-butadiene-acrylonitrile-repeating unit (d), as a binder polymer, and the repeating unit (d) is derived from butyl acrylate and/or methyl methacrylate.

According to the ninth embodiment of the present disclosure, there is provided the electrode for an electrochemical device as defined in any one of the first to the eighth embodiments, wherein the bottommost layer has a content (wt %) of conductive material based on 100 wt % of the bottommost layer equal to or higher than the content (wt %) of conductive material based on 100 wt % of the topmost layer.

According to the tenth embodiment of the present disclosure, there is provided the electrode for an electrochemical device as defined in any one of the first to the ninth embodiments, which is a negative electrode.

According to the eleventh embodiment of the present disclosure, there is provided a lithium-ion secondary battery including the electrode for an electrochemical device as defined in any one of the first to the tenth embodiments.

Advantageous Effects

According to the present disclosure, it is possible to improve the binding force and resistance characteristics of a multilayer structured electrode by using a different composition of binder at the bottommost portion that is in contact with the current collector and at the topmost portion that is in contact with the separator. When using the multilayer structured electrode obtained by controlling the binder composition of the topmost portion and that of the bottommost portion to have a suitable composition of ingredients, it is possible to further improve battery performance, including capacity, life, output, or the like.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression ‘a part includes an element’ does not preclude the presence of any additional elements but means that the part may further include the other elements.

As used herein, the terms ‘about’, ‘substantially’, or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression ‘A and/or B’ means ‘A, B or both of them’.

Specific terms used in the following description are for illustrative purposes and are not limiting. Such terms as ‘right’, ‘left’, ‘top surface’ and ‘bottom surface’ show the directions in the drawings to which they are referred. Such terms as ‘inwardly’ and ‘outwardly’ show the direction toward the geometrical center of the corresponding apparatus, system and members thereof and the direction away from the same, respectively. ‘Front’, ‘rear’, ‘top’ and ‘bottom’ and related words and expressions show the positions and points in the drawings to which they are referred and should not be limiting. Such terms include the above-listed words, derivatives thereof and words having similar meanings.

As used herein, the mark ‘*’ in a chemical formula refers to a possibility of being bound to any other element or repeating unit.

The present disclosure relates to an electrode for an electrochemical device and an electrochemical device including the same.

According to the present disclosure, the electrode includes: an electrode current collector; and an electrode active material layer disposed on at least one surface of the electrode current collector, wherein the electrode active material layer includes an electrode active material, a binder resin and a conductive material.

According to the present disclosure, the electrode active material layer has a multilayer structure including two or more stacked sub-layers, particularly, the bottommost layer as a sub-layer that is in contact with the current collector in the electrode active material layer, and the other sub-layer (s) except that bottommost layer. According to an embodiment of the present disclosure, the sub-layer that is in contact with the separator among the sub-layers is referred to as the topmost layer. According to an embodiment of the present disclosure, the electrode active material layer may include the bottommost layer and the topmost layer disposed at the top of the bottommost layer. According to an embodiment of the present disclosure, the electrode may have a bilayer structure including the bottommost layer and the topmost layer. When the electrode has such a bilayer structure, the ratio of the thickness of the topmost layer to that of the bottommost layer may be 6:4-4:6.

The bottommost layer includes a first binder resin, and the first binder resin includes copolymer resin (A) containing at least two selected from: (a) a vinyl aromatic monomer; (b) a conjugated diene-based monomer; (c) a vinyl cyanide compound-derived repeating unit; and (d) a (meth)acrylate compound-derived repeating unit. The copolymer resin (A) may include at least one selected from: copolymer resin (A1) containing all of the repeating units (a)-(d); copolymer resin (A2) containing the repeating units (a), (b) and (c);

copolymer resin (A3) containing the repeating units (a), (b) and (d); and copolymer resin (A4) containing the repeating units (a) and (b).

The copolymer resin (A) may be present in an amount of 80 wt % or more, preferably 90 wt % or more, based on 100 wt % of the first binder resin. For example, the first binder resin may include the copolymer resin (A) alone.

In addition, the topmost layer includes a second binder resin, and the second binder resin includes copolymer resin (B) containing at least three selected from: (a) a vinyl aromatic monomer; (b) a conjugated diene-based monomer; (c) a vinyl cyanide compound-derived repeating unit; and (d) a (meth)acrylate compound-derived repeating unit. According to an embodiment of the present disclosure, the copolymer resin (B) may include at least one selected from: copolymer resin (B1) containing all of the repeating units (a)-(d); copolymer resin (B2) containing the repeating units (a), (b) and (c); and copolymer resin (B3) containing the repeating units (a), (b) and (d).

The copolymer resin (B) may be present in an amount of 80 wt % or more, preferably 90 wt % or more, based on 100 wt % of the second binder resin. For example, the second binder resin may include the copolymer resin (B) alone.

Particular examples of the vinyl aromatic monomer (a) may include at least one selected from styrene, α-methylstyrene, 3-methylstyrene, 4-methylstyrene, 4-propylstyrene, 1-vinyl naphthalene, 4-cyclohexylstyrene, 4-(p-methylphenyl)styrene and 1-vinyl-5-hexylnaphthalene. According to an embodiment, the vinyl aromatic monomer (a) may include styrene and/or α-methylstyrene.

According to an embodiment of the present disclosure, the vinyl aromatic monomer may include at least one of the compound represented by the following Chemical Formula 1:

[Chemical Formula 1]

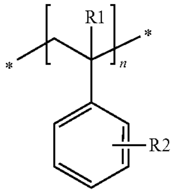

wherein each of R1 and R2 may independently represent H or a C1-C30 linear or branched alkyl group. According to an embodiment of the present disclosure, at least one hydrogen atom of the alkyl group may be substituted with a halogen element. According to an embodiment of the present disclosure, each of R1 and R2 may independently represent a methyl group, an ethyl group, a propyl group, an isopropyl group, a butyl group, an isobutyl group or a pentyl group, but is not limited thereto. Particularly, each of R1 and R2 may be hydrogen. In a variant, at least one of R1 and R2 may be an alkyl group. Meanwhile, in Chemical Formula 1, n is an integer of 1 or more.

Particular examples of the conjugated diene-based monomer (b) may include at least one selected from 1,3-butadiene, 2,3-dimethyl-1,3-butadiene, piperylene, 3-butyl-1,3-octadiene, isoprene and 2-phenyl-1,3-butadiene.

According to an embodiment of the present disclosure, the conjugated diene-based monomer may include at least one of the compounds represented by the following Chemical Formula 2:

[Chemical Formula 2]

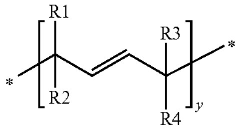

wherein each of R1, R2, R3 and R4 may independently represent H or a C1-C30 linear or branched alkyl group. According to an embodiment of the present disclosure, at least one hydrogen atom of the alkyl group may be substituted with a halogen element. According to an embodiment of the present disclosure, each of R1, R2, R3 and R4 may independently represent a methyl group, an ethyl group, a propyl group, an isopropyl group, a butyl group, an isobutyl group or a pentyl group, but is not limited thereto. Particularly, each of R1, R2, R3 and R4 may be hydrogen. In a variant, at least one of them may be an alkyl group, and the others may represent H. Meanwhile, in Chemical Formula 2, y is an integer of 1 or more.

The repeating unit (c) derived from a vinyl cyanide compound may be a repeating unit derived from at least one selected from the group consisting of acrylonitrile, methacrylonitrile and derivatives thereof, particularly, a repeating unit derived from acrylonitrile.

According to an embodiment of the present disclosure, the repeating unit (c) derived from a vinyl cyanide compound may include at least one of the repeating units represented by the following Chemical Formula 3:

[Chemical Formula 3]

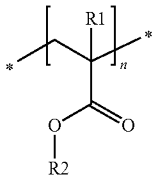

wherein each of R1 and R2 may independently represent H or a C1-C30 linear or branched alkyl group. According to an embodiment of the present disclosure, at least one hydrogen atom of the alkyl group may be substituted with a halogen element. According to an embodiment of the present disclosure, each of R1 and R2 may independently represent a methyl group, an ethyl group, a propyl group, an isopropyl group, a butyl group, an isobutyl group or a pentyl group, but is not limited thereto. Particularly, at least one of R1 and R2 may be an alkyl group, and the other may represent H. Meanwhile, in Chemical Formula 3, n is an integer of 1 or more.

The (meth)acrylate has a meaning covering acrylate and methacrylate. According to an embodiment of the present disclosure, the repeating unit (d) derived from a (meth) acrylate compound may be at least one selected from the group consisting of repeating units derived from alkyl acrylates and repeating units derived from alkyl methacrylates. Particular examples of the alkyl acrylates may include at least one selected from the group consisting of methyl acrylate, ethyl acrylate, propyl acrylate, butyl acrylate, hexyl acrylate and 2-ethylhexyl acrylate, particularly, at least one selected from butyl acrylate and methyl acrylate. In addition, particular examples of the alkyl methacrylates may include at least one selected from the group consisting of methyl methacrylate, ethyl methacrylate, propyl methacrylate, butyl methacrylate, hexyl methacrylate and 2-ethylhexyl methacrylate, particularly, at least one selected from butyl methacrylate and methyl methacrylate.

According to an embodiment of the present disclosure, the repeating unit (d) derived from a (meth)acrylate compound may include at least one of the repeating units represented by the following Chemical Formula 4:

[Chemical Formula 4]

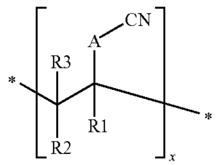

wherein A represents $-(CH_2)_n-$ (wherein n is a number of 1-10), and each of R1, R2 and R3 may independently represent H or a C1-C30 linear or branched alkyl group. According to an embodiment of the present disclosure, at least one hydrogen atom of the alkyl group may be substituted with a halogen element. According to an embodiment of the present disclosure, each of R1, R2 and R3 may independently represent a methyl group, an ethyl group, a propyl group, an isopropyl group, a butyl group, an isobutyl group or a pentyl group, but is not limited thereto. Particularly, each of R1, R2 and R3 may be hydrogen. In a variant, at least one of them may be an alkyl group, and the others may represent H. Meanwhile, in Chemical Formula 4, x is an integer of 1 or more.

According to an embodiment of the present disclosure, the copolymer resin (A1) may include all of (a)-(d), wherein (c) may be a repeating unit derived from acrylonitrile, and (d) may be a repeating unit derived from butyl acrylate methyl methacrylate.

In addition, the sum of the content (wt %) of (c) and the content (wt %) of (d) may be 20 wt % or less, preferably 19 wt % or less, based on 100 wt % of the copolymer resin (A1). Further, the sum of the content (wt %) of (c) and the content (wt %) of (d) in the bottommost layer may be 20 wt % or less, preferably.

As used herein, the content of each repeating unit means the amount (wt %) of each repeating unit contained in each binder resin and/or each copolymer resin, and may be determined by $^1$H NMR spectrometry.

According to an embodiment of the present disclosure, the copolymer resin (A1) may include a quaternary copolymer of styrene-butadiene-acrylonitrile-repeating unit (d), wherein the repeating unit (d) may include at least one of the repeating units derived from butyl acrylate and methyl methacrylate. In addition, the copolymer resin (A4) may include styrene-butadiene rubber (SBR).

According to an embodiment of the present disclosure, the copolymer resin (B1) may include all of (a)-(d), wherein (c) may include a repeating unit derived from acrylonitrile, and (d) may include a repeating unit derived from butyl acrylate and methyl methacrylate. According to an embodiment of the present disclosure, the copolymer resin (B1) may include a quaternary copolymer of styrene-butadiene-acrylonitrile-repeating unit (d), wherein the repeating unit (d) may include at least one of the repeating units derived from butyl acrylate and methyl methacrylate.

According to an embodiment of the present disclosure, the sum of the content (wt %) of the repeating unit (c) and the content (wt %) of the repeating unit (d) contained in the topmost layer is preferably larger than the sum of the content (wt %) of the repeating unit (c) and the content (wt %) of the repeating unit (d) contained in the bottommost layer.

When the total content of the repeating unit (c) and the repeating unit (d) in the bottommost layer facing the current collector is relatively lower as compared to the topmost layer as mentioned above, the dry adhesion and wet adhesion between the electrode active material layer and the current collector are maintained at a high level or is improved, and thus the electrical contact between the electrode current collector and the electrode active material layer is maintained to provide a battery with improved resistance characteristics and life characteristics.

Meanwhile, according to an embodiment of the present disclosure, referring to the repeating units (c) and (d) in each electrode active material layer, the first binder resin in the bottommost layer does not include the repeating units (c) and (d), or ratio E (sum of the content (wt %) of the repeating unit (c) and the content (wt %) of the repeating unit (d) in the topmost layer/sum of the content (wt %) of the repeating unit (c) and the content (wt %) of the repeating unit (d) in the bottommost layer) of the total content of the repeating units (c) and (d) in the topmost layer to the total content of those repeating units in the bottommost layer is larger than 1. According to an embodiment of the present disclosure, E may be 1.5 or more, or 2 or more.

According to the present disclosure, 'dry adhesion' refers to the adhesion between the electrode current collector and the electrode active material layer in a state wherein the electrode is not in contact with an electrolyte after its manufacture, and 'wet adhesion' refers to the adhesion between the electrode current collector and the electrode active material layer in a state after the electrode is in contact with an electrolyte. The expression 'electrode is in contact with an electrolyte' means that the electrode is wetted with the electrolyte, or the electrode is wetted with the electrolyte and then taken out from the electrolyte.

In addition, when the total content (wt %) of the repeating unit (c) and the repeating unit (d) in the binder resin is high, electrolyte absorptivity is relatively higher as compared to the opposite case. Therefore, when the topmost layer has a high content of the repeating unit (c) and the repeating unit (d), the electrode active material layer shows high electrolyte absorptivity to provide the electrode with improved resistance characteristics.

Meanwhile, the copolymers A and B may be prepared by using a method generally known to those skilled in the art with no particular limitation. For example, the repeating unit(s) selected from the repeating units (a)-(d) are subjected to mass polymerization in a reaction medium in the presence of an alginate metal salt to obtain the copolymers. The reaction medium may be a conventionally used organic solvent, and particular examples thereof include: an aromatic hydrocarbon compound, such as ethyl benzene, benzene, toluene or xylene; a ketone compound, such as methyl ethyl ketone or acetone; an aliphatic hydrocarbon compound, such as n-hexane; a halogenated hydrocarbon compound, such as chloroform; an alicyclic hydrocarbon compound, such as cyclohexane; or the like. In addition, the mass polymerization may be carried out by using an additive, such as a polymerization initiator or a molecular weight modifier, in addition to the above-described ingredients. The mass polymerization may be carried out in a continuous processing system including a raw material-introducing pump, a continuous agitation vessel, a preheating vessel, an evaporation vessel, a polymer-conveying pump and an extrusion processor, but is not limited thereto.

According to an embodiment of the present disclosure, the electrode active material layer may have a bilayer structure including a lower layer facing the electrode current collector and an upper layer formed on the surface of the lower layer, wherein the upper layer may include the copolymer resin (B) at a content of 90 wt % or more based on 100 wt % of the binder resin, and the lower layer may include the copolymer resin (A) at a content of 90 wt % or more based on 100 wt % of the binder resin. The electrode according to the present disclosure is characterized by such a binder resin distribution. In this manner, it is possible to ensure high peel strength between the current collector and the electrode active material layer both in a dry state and in a wet state, and to provide an effect of improving ion conductivity by virtue of high electrolyte absorptivity.

Meanwhile, according to an embodiment of the present disclosure, the bottommost layer has a content of conductive material equal to or higher than the content of conductive material in the topmost layer. For example, the bottommost layer has a content of conductive material of 1.5 wt % or more based on 100 wt % of the bottommost layer, while the topmost layer has a content of conductive material of 1.5 wt % or less based on 100 wt % of the topmost layer. When the content of conductive material in the bottommost layer is equal to or higher than the content of conductive material in the topmost layer as mentioned above, it is possible to reduce a decrease in wet adhesion as compared to dry adhesion, even when the binder resin is in contact with an electrolyte, and thus it is possible to ensure sufficient peel strength in a wet state.

Meanwhile, when different ingredients are present in the upper layer and lower layer of the electrode active material layer as described above, an intermixing zone in which different types of ingredients are present in combination may exist at the portion whether the upper layer and lower layer are in contact with each other. This is because when forming an active material layer by coating slurry for forming an upper layer and slurry for forming a lower layer on the current collector at the same time or with a very small time interval, and then drying both types of slurry at the same time, a specific intermixing portion is generated on the interface where the slurry for forming an upper layer is in contact with the slurry for forming a lower layer before drying, and the intermixing portion is formed in the form of a layer of intermixing zone during the subsequent drying.

According to an embodiment of the present disclosure, the electrode may be a negative electrode, a positive electrode, or both. Preferably, the electrode is a negative electrode.

When the electrode is a negative electrode, the negative electrode has a negative electrode active material layer containing a negative electrode active material, a conductive material and a binder resin. Reference will be made to the above description about the binder resin contained in the negative electrode active material layer. According to an embodiment of the present disclosure, the electrode may further include, as a binder resin, at least one selected from polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate and fluoro-rubber.

The negative electrode active material may include any one selected from: lithium metal oxide; carbonaceous materials, such as non-graphitizable carbon or graphite-based carbon; metal composite oxides, such as $Li_xFe_2O_3$ ($0 \le x \le 1$), $Li_xWO_2$ ($0 \le x \le 1$), $Sn_xMe_{1-x}Me'_yO_z$ (Me:Mn, Fe, Pb, Ge; Me':Al, B, P, Si, elements of Group 1, 2 or 3 in the Periodic Table, halogen; $0 < x \le 1$; $1 \le y \le 3$; $1 \le z \le 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the negative electrode current collector is not particularly limited, as long as it causes no chemical change in the corresponding battery and has conductivity. Particular examples of the negative electrode current collector may include copper, stainless steel, aluminum, nickel, titanium, baked carbon, copper or stainless steel surface-treated with carbon, nickel, titanium or silver, aluminum-cadmium alloy, or the like.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; conductive materials, such as polyphenylene derivatives, or the like.

Meanwhile, according to an embodiment of the present disclosure, the electrode may be a positive electrode. The positive electrode may be obtained by mixing a positive electrode active material, a conductive material, a binder and a solvent to form slurry, and coating the slurry directly onto a metal current collector, or casting the slurry onto a separate support, peeling a positive electrode active material film from the support and laminating the film on a metal current collector.

The positive electrode active material may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \le x < 0.5$, $0 \le y < 0.5$, $0 \le z < 0.5$, and $0 < x+y+z \le 1$), or a mixture of at least two of them. According to an embodiment of the present disclosure, the positive electrode active material may preferably include lithium cobalt oxide and/or lithium nickel cobalt manganese oxide.

The positive electrode may include, as a binder resin, at least one selected from polyvinylidene fluoride, polyvinylidene fluoride-co-hexafluoropropylene, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alchol, cyanoethyl cellulose, cyanoethyl sucrose, pullulan, and carboxymethyl cellulose.

Meanwhile, reference will be made to the above description related with the negative electrode about the current collector and conductive material contained in the positive electrode.

Hereinafter, the method for manufacturing an electrode according to an embodiment of the present disclosure will be explained. The method may include the first step to the third step as described hereinafter.

(First Step) Step of preparing an electrode active material layer composition for a first layer including an electrode active material for a first layer, an electrode binder for a first layer and an electrode conductive material for a first layer, and an electrode active material composition for a second layer including an electrode active material for a second layer, an electrode binder for a second layer and an electrode conductive material for a second layer;

(Second Step) Step of dispersing each of the electrode active material layer composition for a first layer and the electrode active material layer composition for a second layer obtained from (First Step) in a dispersion medium to prepare electrode active material layer slurry for a first layer and electrode active material layer slurry for a second layer; and (Third Step) Step of applying the electrode active material layer slurry for a first layer and electrode active material layer slurry for a second layer simultaneously or sequentially to an electrode current collector, and drying both types of slurry at the same time to form a first electrode active material layer disposed on at least one surface of the electrode current collector and a second electrode active material layer disposed on the top of the first electrode active material layer.

Meanwhile, according to an embodiment of the present disclosure, the step of forming the first electrode active material layer and the step of forming the second electrode active material layer may be carried out simultaneously or sequentially.

In other words, the step of forming the first electrode active material layer and the step of forming the second electrode active material layer may include completely applying the first electrode active material layer slurry to at least one surface of the electrode current collector, and applying the second electrode active material layer slurry on the completely applied first electrode active material layer slurry, followed by drying. In a variant, the step of forming the first electrode active material layer and the step of forming the second electrode active material layer may include applying the first electrode active material layer slurry to at least one surface of the electrode current collector, and applying the second electrode active material layer slurry on the applied first electrode active material layer slurry at the same time, followed by drying.

Particularly, the first electrode coating layer-forming slurry may be coated and dried first on the electrode current collector, and then the second electrode coating layer-forming slurry may be coated and dried thereon to form the first electrode active material layer and the second electrode active material layer sequentially, or the two types of slurry may be coated by using an instrument, such as a double slot die, at the same time, followed by drying, to form the first electrode active material layer and the second electrode active material layer.

The method for coating the slurry is not particularly limited, as long as it is used conventionally in the art. For example, a coating process using a slot die, a Mayer bar coating process, a gravure coating process, a dip coating process, a spray coating process, etc. may be used.

In another aspect of the present disclosure, there is provided a secondary battery including the above-described electrode. The secondary battery includes a positive electrode, a negative electrode and a separator interposed between the positive electrode and the negative electrode, wherein at least one of the positive electrode and the negative electrode may have the above-described multilayer electrode characteristics. In addition, the secondary battery may include an electrolyte.

The separator may be a conventional porous polymer film used conventionally as a separator. For example, the porous polymer film may be a porous polymer film made of a polyolefininc polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Examples 1-6 and Comparative Examples 1-3: Manufacture of Bilayer Structured Negative Electrode Having Active Material Layer First, a graphite material as a negative electrode active material, a conductive material and a binder resin were mixed with water at the ratio (wt %) as shown in the following Table 1 and Table 2 to prepare slurry for an upper layer of negative electrode active material layer and slurry for a lower layer of negative electrode active material layer. Meanwhile, carboxymethyl cellulose (Daicel 2200) was added at a ratio of 1 part by weight based on 100 parts by weight of the total weight of the negative electrode active material, conductive material and binder resin. Herein, each slurry had a solid content of 49 wt %.

The electrode active material layer slurry for a first layer was coated on one surface of copper (Cu) foil (thickness 10 pin) as a negative electrode current collector and the electrode active material layer slurry for a second layer was coated on the electrode active material layer slurry for a first layer, by using a double slot die, and then the slurry was dried at 100° C. for 3 minutes to form a bilayer structured electrode. The resultant upper and lower active material layers were pressed at the same time by roll pressing to obtain a negative electrode including a bilayer structured active material layer having an upper layer and lower layer. The two negative electrode active material layers had a thickness ratio of about 1:1. The loading amount of electrode active material layer in each of the electrodes according to Examples and Comparative Examples was 378 mg/25 $cm^2$, and each electrode had a porosity of 31 vol %.

TABLE 1

| | | | Ex. 1 | Ex. 2 | Ex. 3 | Ex. 4 | Ex. 5 | Ex. 6 |
|---|---|---|---|---|---|---|---|---|
| Upper layer | Negative electrode active material | Ingredient | PAS-C3B | PAS-C3B | PAS-C3B | PAS-C3B | PAS-C3B | PAS-C3B |
| | | Content (wt %) | 96.0 | 96.0 | 96.0 | 96.0 | 96.3 | 96.0 |
| | Binder | Ingredient | BML302 | BML302 | BML302 | BML302 | BML302 | BML302 |
| | | Content (wt %) | 2.5 | 2.5 | 2.5 | 2.5 | 2.5 | 2.5 |
| | Conductive material | Ingredient | Super C65 | Super C65 | Super C65 | Super C65 | Super C65 | Super C65 |
| | | Content (wt %) | 1.5 | 1.5 | 1.5 | 1.5 | 1.2 | 1.5 |
| Lower layer | Negative electrode active material | Ingredient | PAS-C3B | PAS-C3B | PAS-C3B | PAS-C3B | PAS-C3B | PAS-C3B |
| | | Content (wt %) | 96.0 | 96.0 | 96.0 | 96.0 | 95.7 | 96.0 |
| | Binder | Ingredient | SBR (BM451B) | Binder resin 1 | Binder resin 2 | Binder resin 3 | SBR (BM451B) | Binder resin 4 |
| | | Content (wt %) | 2.5 | 2.5 | 2.5 | 2.5 | 2.5 | 2.5 |
| | Conductive material | Ingredient | Super C65 | Super C65 | Super C65 | Super C65 | Super C65 | Super C65 |
| | | Content (wt %) | 1.5 | 1.5 | 1.5 | 1.5 | 1.8 | 1.5 |

TABLE 2

| | | | Comp. Ex. 1 | Comp. Ex. 2 | Comp. Ex. 3 |
|---|---|---|---|---|---|
| Upper layer | Negative electrode active material | Ingredient | PAS-C3B | PAS-C3B | PAS-C3B |
| | | Content (wt %) | 96.0 | 96.3 | 95.7 |
| | Binder | Ingredient | BML302 | BML302 | BML302 |
| | | Content (wt %) | 2.5 | 2.5 | 2.5 |
| | Conductive material | Ingredient | Super C65 | Super C65 | Super C65 |
| | | Content (wt %) | 1.5 | 1.2 | 1.8 |

TABLE 2-continued

| | | | Comp. Ex. 1 | Comp. Ex. 2 | Comp. Ex. 3 |
|---|---|---|---|---|---|
| Lower layer | Negative electrode active material | Ingredient | PAS-C3B | PAS-C3B | PAS-C3B |
| | | Content (wt %) | 96.0 | 95.7 | 96.3 |
| | Binder | Ingredient | BML302 | BML302 | BML302 |
| | | Content (wt %) | 2.5 | 2.5 | 2.5 |
| | Conductive material | Ingredient | Super C65 | Super C65 | Super C65 |
| | | Content (wt %) | 1.5 | 1.8 | 1.2 |

Meanwhile, each binder resin used in Table 1 and Table 2 is a copolymer containing a plurality of repeating units, and the constitution of repeating units in the binder resin is shown in the following Table 3 and Table 4, wherein the content is expressed in the unit of wt %. The content of each of the repeating units in each binder resin was determined by using $^{1}H$ NMR spectrometry. Herein, $^{1}H$ NMR spectrometry was carried out by using Agilent Unity Innova 500 MHz NMR (Nono probe or HR MAS probe) and Bruker Avance III HD 500 MHz NMR (Prodigy probe) instruments. The analysis condition includes s2pul, spun at 2.5 kHz and NMR solvent (TCE-$d_2$).

TABLE 3

| | Styrene | Butadiene | Butyl acrylate | Methyl methacrylate | Acrylonitrile |
|---|---|---|---|---|---|
| Binder 1 | 49.2 | 38.6 | 4.6 | 2.1 | 5.5 |
| Binder 2 | 42.8 | 38.9 | 6.9 | 3.2 | 8.2 |
| Binder 3 | 55.6 | 38.4 | 2.3 | 1.05 | 2.65 |
| Binder 4 | 41.6 | 38.9 | 7.4 | 3.4 | 8.7 |
| BML302 | 36.5 | 39.1 | 9.2 | 4.2 | 11 |
| BM451B | 61.9 | 38.1 | 0 | 0 | 0 |

TABLE 4

| | Upper layer/ Lower layer | Conductive material content (wt %) | Styrene (wt %) | Butadiene (wt %) | Butyl acrylate (wt %) | Methyl methacrylate (wt %) | Acrylonitrile (wt %) |
|---|---|---|---|---|---|---|---|
| Ex. 1 | Upper layer | 1.5 wt % | 36.5 | 39.1 | 9.2 | 4.2 | 11 |
| | Lower layer | 1.5 wt % | 61.9 | 38.1 | 0 | 0 | 0 |
| Ex. 2 | Upper layer | 1.5 wt % | 36.5 | 39.1 | 9.2 | 4.2 | 11 |
| | Lower layer | 1.5 wt % | 49.2 | 38.6 | 4.6 | 2.1 | 5.5 |
| Ex. 3 | Upper layer | 1.5 wt % | 36.5 | 39.1 | 9.2 | 4.2 | 1 |
| | Lower layer | 1.5 wt % | 42.8 | 38.9 | 6.9 | 3.2 | 8.2 |
| Ex. 4 | Upper layer | 1.5 wt % | 36.5 | 39.1 | 9.2 | 4.2 | 11 |
| | Lower layer | 1.5 wt % | 55.6 | 38.4 | 2.3 | 1.05 | 2.65 |
| Ex. 5 | Upper layer | 1.2 wt % | 36.5 | 39.1 | 9.2 | 4.2 | 11 |
| | Lower layer | 1.8 wt % | 61.9 | 38.1 | 0 | 0 | 0 |
| Ex. 6 | Upper layer | 1.5 wt % | 36.5 | 39.1 | 9.2 | 4.2 | 11 |
| | Lower layer | 1.5 wt % | 41.6 | 38.9 | 7.4 | 3.4 | 8.7 |
| Comp. Ex. 1 | Upper layer | 1.5 wt % | 36.5 | 39.1 | 9.2 | 4.2 | 11 |
| | Lower layer | 1.5 wt % | 36.5 | 39.1 | 9.2 | 4.2 | 11 |
| Comp. Ex. 2 | Upper layer | 1.2 wt % | 36.5 | 39.1 | 9.2 | 4.2 | 11 |
| | Lower layer | 1.8 wt % | 36.5 | 39.1 | 9.2 | 4.2 | 11 |
| Comp. Ex. 3 | Upper layer | 1.8 wt % | 36.5 | 39.1 | 9.2 | 4.2 | 11 |
| | Lower layer | 1.2 wt % | 36.5 | 39.1 | 9.2 | 4.2 | 11 |

Evaluation of Physical Properties

Test Example 1) Determination of Peel Strength: Evaluation of Dry Adhesion

The electrode obtained according to each of Examples 1-6 and Comparative Examples 1-3 was cut into a size of width×length of 15 mm×50 mm to prepare a test sample. The prepared negative electrode sample was fixed on a glass plate by using a tape for adhesion to a substrate in such a manner that the active material layer of the sample might face the glass plate. Then, a remover tape having a size of width×length of 20 mm×50 mm was attached to the current collector of the negative electrode sample, and the peel strength was determined by using a UTM system. The peel strength was determined at a peel rate of 300 mm/min with a peel distance of 50 mm at an angle of 90°.

Test Example 2) Determination of Peel Strength: Evaluation of Wet Adhesion

The electrode obtained according to each of Examples 1-6 and Comparative Examples 1-3 was used to manufacture a battery.

First, $LiNi_{0.6}Co_{0.2}Mn_{0.2}O_2$ as a positive electrode active material, a binder (PVDF) and a conductive material (acetylene black) were introduced to NMP at a weight ratio of 96.5:1.5:2 to prepare slurry for forming a positive electrode active material layer (solid content 70 wt %). The slurry was applied to aluminum foil (thickness: about 10 μm) and dried at 130° C. for 2 minutes to prepare a positive electrode.

A porous film (10 μm) made of polyethylene was prepared as a separator. Then, the positive electrode, the separator and the negative electrode were stacked successively, and the resultant stack was subjected to a lamination process of pressurizing the stack at 80° C. to obtain an electrode assembly.

The electrode assembly was introduced to a pouch-type battery casing, and an electrolyte was injected thereto to obtain a battery. The electrolyte was prepared by mixing ethylene carbonate, propylene carbonate, ethyl propionate and propyl propionate at a weight ratio of 2:1:2.5:4.5 and introducing $LiPF_6$ at a concentration of 1.2 M.

The battery according to each of Examples and Comparative Examples was charged in a constant current (CC) mode at 1.0 C to 4.25 V, charged in a constant voltage (CV) mode to a cutoff current of 0.005 C, and then discharged to 3 V in a constant current mode at 1 C. The charge/discharge cycle was repeated 100 times. The test was carried out at room temperature (25° C.). Then, each battery was disassembled to take out the negative electrode, and the negative electrode was determined in terms of adhesion in the same manner as Test Example 1).

Test Results

The results of dry adhesion and wet adhesion of the negative electrode active material layer in each of Examples 1-6 and Comparative Examples 1-3 are shown in the following Table 5. As can be seen from the results, the negative electrode according to each of Examples 1-6 shows excellent dry-state adhesion, and particularly, shows a smaller decrease in wet-state adhesion as compared to the dry-state adhesion, and thus ensures a high level of adhesion even in a wet state. In Table 5, adhesion retention is a percentage of wet adhesion based on dry adhesion.

TABLE 5

| | Dry adhesion (gf/20 mm, 180°) | Wet adhesion (gf/20 mm, 180°) | Adhesion retention (%) |
|---|---|---|---|
| Ex. 1 | 96.8 | 95.3 | 98.4% |
| Ex. 2 | 97.7 | 92.1 | 94.3% |
| Ex. 3 | 98 | 87.5 | 89.3% |
| Ex. 4 | 97.2 | 94.6 | 97.3% |
| Ex. 5 | 114.1 | 113.2 | 99.2% |
| Ex. 6 | 97.1 | 71 | 73.1% |
| Comp. Ex. 1 | 98.6 | 54.3 | 55.0% |
| Comp. Ex. 2 | 104.1 | 80.6 | 77.4% |
| Comp. Ex. 3 | 98.4 | 50.2 | 51.0% |

Example 6 and Comparative Example 1 use the same content of conductive material but a different content of repeating units (c) and (d) in the upper layer and the lower layer. When comparing Example 6 to Comparative Example 1, Example 6 shows a higher adhesion retention as compared to Comparative Example 1. In the case of Comparative Example 2, even if the content of conductive material in the lower layer is higher, the content of repeating units (c) and (d) in the lower layer is higher as compared to the upper layer. As a result, Comparative Example 2 shows a lower adhesion retention as compared to Examples. In the case of Comparative Example 3, the content of repeating units (c) and (d) in the lower layer is higher and the content of conductive material in the lower layer is lower as compared to the upper layer. As a result, Comparative Example 3 shows a significantly low adhesion retention.

What is claimed is:

1. An electrode for an electrochemical device, comprising: an electrode current collector; and a multilayer structured electrode active material layer disposed on at least one surface of the electrode current collector and having two or more stacked sub-layers, wherein the multilayer structured electrode active material layer comprises an electrode active material, a binder resin and a conductive material, a bottommost layer of the multilayer structured electrode active material layer comprises copolymer resin (A) as a binder resin, a topmost layer of the multilayer structured electrode active material layer is disposed on a top of the bottommost layer, and the topmost layer of the multilayer structured electrode active material layer includes copolymer resin (B) as a binder resin, the copolymer resin (A) comprises a copolymer containing a repeating unit derived from at least one selected from the group consisting of: (a) a vinyl aromatic monomer; (b) a conjugated diene-based monomer; (c) a vinyl cyanide compound-derived repeating unit; and (d) a (meth)acrylate compound-derived repeating unit, the copolymer resin (B) comprises a copolymer containing (a) a vinyl aromatic monomer; (b) a conjugated diene-based monomer; (c) a vinyl cyanide compound-derived repeating unit; and (d) a (meth)acrylate compound-derived repeating unit, and a total content (wt %) of the repeating unit (c) and the repeating unit (d) in the topmost layer is larger than a total content (wt %) of the repeating unit (c) and the repeating unit (d) in the bottommost layer, wherein the total content (wt %) of the repeating unit (c) and the repeating unit (d) in the bottommost layer is 20 wt % or less.

2. The electrode for the electrochemical device according to claim 1, wherein a vinyl cyanide compound of the vinyl cyanide compound-derived repeating unit comprises at least one of acrylonitrile or methacrylonitrile.

3. The electrode for the electrochemical device according to claim 1, wherein a (meth)acrylate compound of the (meth)acrylate compound-derived repeating unit comprises at least one selected from the group consisting of methyl acrylate, ethyl acrylate, propyl acrylate, butyl acrylate, hexyl acrylate, 2-ethylhexyl acrylate, methyl methacrylate, ethyl methacrylate, propyl methacrylate, butyl methacrylate, hexyl methacrylate and 2-ethylhexyl methacrylate.

4. The electrode for the electrochemical device according to claim 1, wherein the copolymer resin (A) comprises at least two repeating units selected from the group consisting of: (a) a vinyl aromatic monomer: (b) a conjugated diene-based monomer, (c) a vinyl cyanide compound-derived repeating unit; and (d) a (meth)acrylate compound-derived repeating unit, as a binder resin.

5. The electrode for the electrochemical device according to claim 1, wherein the copolymer resin (B) comprises at least three repeating unit selected from the group consisting of: (a) a vinyl aromatic monomer: (b) a conjugated diene-based monomer, (c) a vinyl cyanide compound-derived repeating unit; and (d) a (meth)acrylate compound-derived repeating unit, as a binder resin.

6. The electrode for the electrochemical device according to claim 1, wherein the bottommost layer comprises a quaternary copolymer of styrene-butadiene-acrylonitrile-(d) a (meth)acrylate compound-derived repeating unit and/or a binary copolymer of styrene-butadiene, as a binder resin, and the styrene-butadiene-acrylonitrile-(d) a (meth)acrylate compound-derived repeating unit is derived from butyl acrylate and/or methyl methacrylate.

7. The electrode for the electrochemical device according to claim 6, wherein the quaternary copolymer comprises a total content of an acrylonitrile repeating unit and the styrene-butadiene-acrylonitrile-repeating unit (d) is 20% or less based on 100 wt % of the quaternary copolymer.

8. The electrode for the electrochemical device according to claim 1, wherein the bottommost layer comprises a quaternary copolymer of styrene-butadiene-acrylonitrile-repeating unit (d), as a binder polymer, and the styrene-butadiene-acrylonitrile-repeating unit (d) is derived from butyl acrylate and/or methyl methacrylate.

9. The electrode for the electrochemical device according to claim 1, wherein the bottommost layer has a content (wt %) of the conductive material based on 100 wt % of the bottommost layer equal to or higher than a content (wt %) of the conductive material based on 100 wt % of the topmost layer.

10. The electrode for the electrochemical device according to claim 1, wherein the electrode is a negative electrode.

11. A lithium-ion secondary battery comprising the electrode for the electrochemical device according to claim 1.

12. The electrode for the electrochemical device according to claim 1, wherein ratio E, which is the total content (wt %) of the repeating unit (c) and the content (wt %) of the repeating unit (d) in the topmost layer/the total content (wt %) of the repeating unit (c) and the content (wt %) of the repeating unit (d) in the bottommost layer, is 1.5 or more.

13. The electrode for the electrochemical device according to claim 1, wherein ratio E, which is the total content (wt %) of the repeating unit (c) and the content (wt %) of the repeating unit (d) in the topmost layer/the total content (wt %) of the repeating unit (c) and the content (wt %) of the repeating unit (d) in the bottommost layer, is 2 or more.

* * * * *